US010663036B2

(12) United States Patent
Stuart et al.

(10) Patent No.: US 10,663,036 B2
(45) Date of Patent: May 26, 2020

(54) GAS TURBINE ENGINE WITH ROTATING REVERSING COMPOUND GEARBOX

(71) Applicant: General Electric Company, Schenectady, NY (US)

(72) Inventors: Alan Roy Stuart, Cincinnati, OH (US); Darek Tomasz Zatorski, Fort Wright, KY (US)

(73) Assignee: General Electric Company, Schenectady, NY (US)

(*) Notice: Subject to any disclaimer, the term of this patent is extended or adjusted under 35 U.S.C. 154(b) by 185 days.

(21) Appl. No.: 15/621,496

(22) Filed: Jun. 13, 2017

(65) Prior Publication Data

US 2018/0355951 A1 Dec. 13, 2018

(51) Int. Cl.
*F16H 1/22* (2006.01)
*F16H 57/033* (2012.01)
(Continued)

(52) U.S. Cl.
CPC ............. *F16H 1/22* (2013.01); *F01D 25/162* (2013.01); *F02C 7/36* (2013.01); *F16H 57/033* (2013.01);
(Continued)

(58) Field of Classification Search
CPC .... F16H 1/22; F16H 2057/02086; F01D 1/24; F01D 25/16; F01D 25/162; F02C 7/36; F05D 2260/40311; F02K 3/072

See application file for complete search history.

(56) References Cited

U.S. PATENT DOCUMENTS 3,673,802 A * 7/1972 Krebs ............... F02C 3/067
60/226.1
4,005,575 A 2/1977 Scott et al.
(Continued)

FOREIGN PATENT DOCUMENTS

CN 102257260 A 11/2011
DE 3933776 A1 4/1991
(Continued)

OTHER PUBLICATIONS

U.S. Appl. No. 15/427,340, filed Feb. 8, 2017.
(Continued)

*Primary Examiner* — Andrew H Nguyen
*Assistant Examiner* — Colin J Paulauskas
(74) *Attorney, Agent, or Firm* — Dority & Manning, P.A.

(57) ABSTRACT

The present disclosure is directed to a gas turbine engine, wherein the gas turbine engine defines a longitudinal direction, a radial direction, and a circumferential direction, and an axial centerline extended along the longitudinal direction, and an upstream end and a downstream end along the longitudinal direction. The gas turbine engine includes an annular stationary turbine frame centered around the axial centerline; an engine shaft extended generally along the longitudinal direction; an input shaft extended generally along the longitudinal direction; and a gear assembly including a first gear coupled to the input shaft, a second gear coupled to the turbine frame, and an inner spool coupling the first gear and the second gear, in which the inner spool defines a gear axis extended therethrough. The inner spool, the first gear, and the second gear are together rotatable about the gear axis. The gear axis is rotatable about the axial centerline of the engine. The gas turbine engine further includes a housing coupled to the inner spool and the engine shaft.

20 Claims, 4 Drawing Sheets

(51) Int. Cl.
*H02K 7/08* (2006.01)
*F01D 25/16* (2006.01)
*F02C 7/36* (2006.01)

(52) U.S. Cl.
CPC .... *H02K 7/083* (2013.01); *F05D 2260/40311* (2013.01); *F16H 2057/0335* (2013.01)

(56) References Cited

U.S. PATENT DOCUMENTS

| | | | |
|---|---|---|---|
| 4,909,031 | A | 3/1990 | Grieb |
| 6,391,948 | B1 | 5/2002 | Clark et al. |
| 7,144,349 | B2 | 12/2006 | Mitrovic |
| 7,296,398 | B2 | 11/2007 | Moniz et al. |
| 7,513,103 | B2 | 4/2009 | Orlando et al. |
| 7,716,914 | B2 | 5/2010 | Schilling |
| 7,882,693 | B2 | 2/2011 | Schilling |
| 7,926,259 | B2 | 4/2011 | Orlando et al. |
| 8,276,362 | B2 | 10/2012 | Suciu et al. |
| 8,366,382 | B1 * | 2/2013 | Muldoon ............... F01D 11/02 415/111 |
| 8,876,462 | B2 | 11/2014 | Balk et al. |
| 9,074,485 | B2 | 7/2015 | Suciu et al. |
| 9,080,512 | B2 | 7/2015 | Suciu et al. |
| 9,647,367 | B1 | 5/2017 | Emaci et al. |
| 10,161,409 | B2 | 12/2018 | Sheridan et al. |
| 2005/0221946 | A1 | 10/2005 | Mitrovic |
| 2005/0241292 | A1 * | 11/2005 | Taylor ............... F01D 1/26 60/226.1 |
| 2009/0151317 | A1 * | 6/2009 | Norris ............... F02C 3/107 60/39.162 |
| 2010/0154384 | A1 * | 6/2010 | Schilling ............... F02C 3/107 60/268 |
| 2013/0255274 | A1 | 10/2013 | Kupratis et al. |
| 2015/0011354 | A1 | 1/2015 | Fabre |
| 2015/0078888 | A1 | 3/2015 | Golshany et al. |
| 2015/0152783 | A1 | 6/2015 | Acquisti |
| 2015/0308351 | A1 | 10/2015 | Sheridan |
| 2016/0222975 | A1 | 8/2016 | Sheridan et al. |
| 2016/0333734 | A1 | 11/2016 | Dowden et al. |

FOREIGN PATENT DOCUMENTS

| | | |
|---|---|---|
| EP | 1939430 A2 | 12/2007 |
| EP | 3524796 A1 | 11/2014 |
| WO | WO2008/044973 A1 | 4/2008 |
| WO | WO2015/102779 A1 | 4/2015 |

OTHER PUBLICATIONS

European Search Report Corresponding to Application No. 18177012 dated Oct. 9, 2018.
Chinese Office Action Corresponding to Application No. 201820607632 dated Apr. 8, 2020.

* cited by examiner

GAS TURBINE ENGINE WITH ROTATING REVERSING COMPOUND GEARBOX

FIELD

The present subject matter relates generally to gas turbine engine architecture. More particularly, the present subject matter relates to reduction gear assembly and turbine section arrangement for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. Additionally, conventional gas turbine engine turbine sections generally include successive rows or stages of stationary and rotating airfoils (e.g. vanes and blades). Stationary airfoils or vanes are often employed to direct or otherwise condition a flow of combustion gases before passing across rotating airfoils or blades. Stationary airfoils often require cooling air routed from other areas of the gas turbine engine, such as the compressor section, to mitigate damage from combustion gases. However, routing air from the compressor section to the turbine section, thereby bypassing the combustion section, generally removes energy for combustion and therefore reduces gas turbine engine efficiency.

Furthermore, conventional low pressure turbines often require a plurality of stages to distribute energy or work to operate the fan assembly and/or compressor to which the low pressure turbine is driving. However, the plurality of stages contribute to axial and radial dimensions of the gas turbine engine, which thereby contributes to weight of the overall engine and aircraft to which it is attached, and consequently adversely impacts fuel efficiency, engine performance, and engine and aircraft efficiency.

Known solutions include adding a reduction gear assembly between a fan assembly and an engine core, which may reduce the quantity of the plurality of stages of a turbine section necessary to operate the fan assembly and compressor to which it is attached, and may generally provide some net increase in engine efficiency and improvement in fuel consumption. However, adding a reduction gear assembly introduces new complexities and limitations to turbine engine design and operation. For example, known reduction gear assemblies have an approximately 100% amount of torque or power routed in series from a low pressure turbine through the gear assembly to drive a fan assembly. In such known arrangements, routing an approximately entire amount of torque or power from the low pressure turbine through the gear assembly to the fan assembly necessitates complex gear assembly designs, increased gear assembly weight for the stresses and loads from the substantially entire load from the turbine section, and generally larger diameters of gear assembly, thereby retaining or increasing radial dimensions of the engine.

Therefore, there exists a need for an engine that may incorporate a reduction gear assembly while reducing or eliminating adverse effects of gear assembly placement, such as increased turbine engine packaging, such as increased diameter, axial length, or both, and/or single-point system failure of low pressure turbine power to the fan assembly.

BRIEF DESCRIPTION

Aspects and advantages of the invention will be set forth in part in the following description, or may be obvious from the description, or may be learned through practice of the invention.

The present disclosure is directed to a gas turbine engine, wherein the gas turbine engine defines a longitudinal direction, a radial direction, and a circumferential direction, and an axial centerline extended along the longitudinal direction, and an upstream end and a downstream end along the longitudinal direction. The gas turbine engine includes an annular stationary turbine frame centered around the axial centerline; an engine shaft extended generally along the longitudinal direction; an input shaft extended generally along the longitudinal direction; and a gear assembly including a first gear coupled to the input shaft, a second gear coupled to the turbine frame, and an inner spool coupling the first gear and the second gear, in which the inner spool defines a gear axis extended therethrough. The inner spool, the first gear, and the second gear are together rotatable about the gear axis. The gear axis is rotatable about the axial centerline of the engine. The gas turbine engine further includes a housing coupled to the inner spool and the engine shaft.

In various embodiments, the inner spool of the gear assembly further includes an inner spool bearing coupled to the inner spool and the housing, in which the inner spool bearing permits rotation of the inner spool, the first gear, and the second gear about the gear axis, and wherein the inner spool, the first gear, and the second gear together move circumferentially around the axial centerline of the engine. In one embodiment, the housing defines radial wall coupled to the inner spool bearing of the inner spool, in which the housing defines an axial wall extended circumferentially around the gear assembly.

In one embodiment, the turbine frame defines a stationary star gear on which the second gear is moveable around the axial centerline of the engine.

In another embodiment, the input shaft defines an input shaft gear interface with the first gear of the gear assembly.

In yet another embodiment, the engine shaft and housing together rotate in a first circumferential direction and the input shaft rotates in a second circumferential direction opposite of the first circumferential direction.

In still another embodiment, the engine shaft and housing together rotate at a first speed and the input shaft rotates at a second speed proportional to and greater than the first speed.

In still yet another embodiment, the housing further includes a second radial wall coupled to the inner spool bearing, and the engine further includes a differential bearing coupled to the second radial wall and the input shaft.

In one embodiment, the engine shaft extends generally along the longitudinal direction and radially within the input shaft and the gear assembly.

In another embodiment, the engine further includes a bearing coupled to the turbine frame and the engine shaft.

In various embodiments, the gas turbine engine further includes a first turbine rotor coupled to the housing; and a second turbine rotor coupled to the input shaft. In one embodiment, the first turbine rotor includes a rotating frame. The rotating frame includes a plurality of radially extended members and an outer shroud extended along the longitudinal direction. A plurality of outer shroud airfoils extends inward along the radial direction from the outer shroud. In another embodiment, the first turbine rotor and the second turbine rotor together define an interdigitated turbine rotor assembly, in which the first turbine rotor and the second turbine rotor alternate along the longitudinal direction. In still another embodiment, the first turbine rotor provides between approximately 25% to about 75% of torque to the engine shaft. In yet another embodiment, the second turbine rotor provides between approximately 30% to about 60% of torque to the engine shaft. In still yet another embodiment, the engine shaft is coupled to a fan assembly, and the first turbine rotor and the second turbine rotor together define a low speed turbine rotor assembly.

In various embodiments, the gear assembly defines a reversing rotating compound gear assembly.

In one embodiment, the gear assembly defines a range of gear ratios of approximately −1.5:1 to about −3:1.

In another embodiment, the gear assembly defines a range of gear ratios of approximately −1.8:1 to about −2.8:1.

In still another embodiment, the input shaft is coupled to the first gear radially within the gear assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
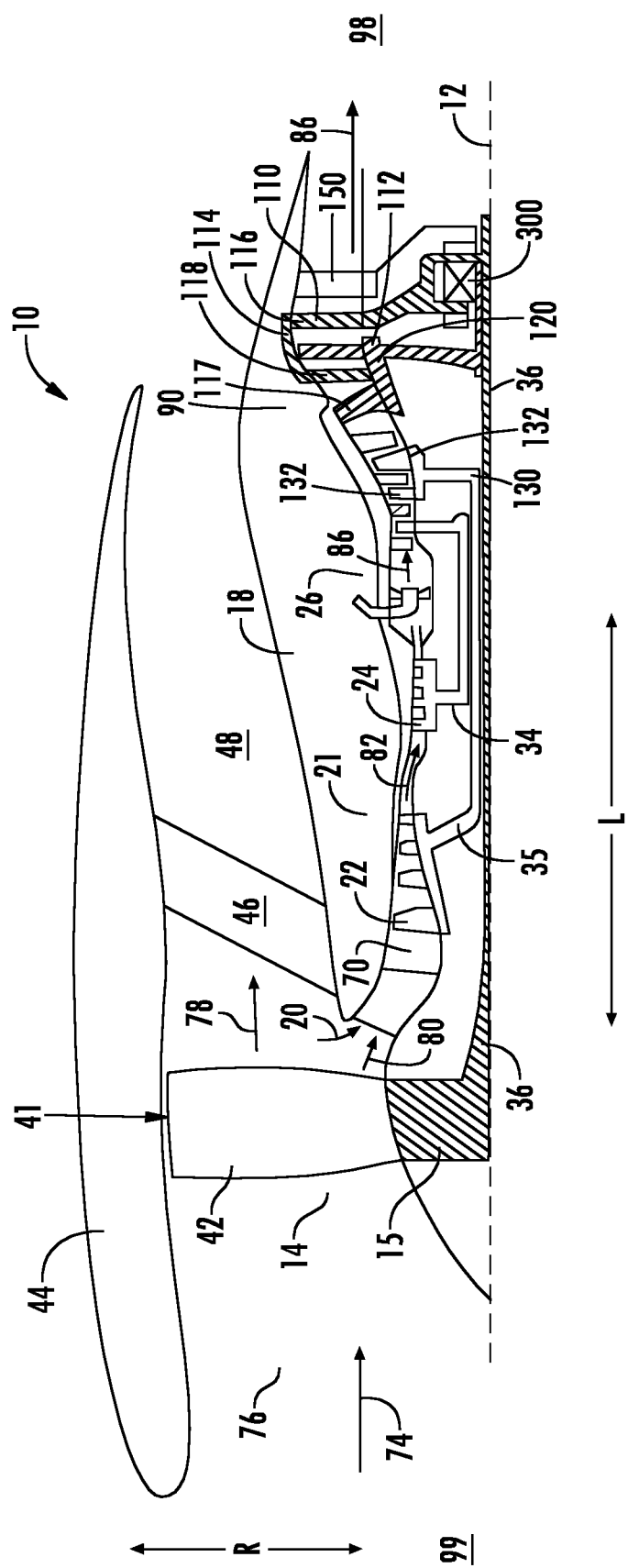
FIG. 1 is a schematic cross sectional view of an exemplary gas turbine engine incorporating an exemplary embodiment of a turbine section and reduction gear assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

A counter rotating turbine with reversing reduction gear assembly is generally provided. The counter rotating turbine with reversing reduction gear assembly incorporates a reduction gear assembly to a gas turbine engine while reducing or eliminating adverse effects of gear assembly placement, such as increased turbine engine packaging, such as diameter or axial length, or both, and/or reducing or eliminating single-point system failure of low pressure turbine power to the fan assembly.

The counter rotating turbine with multiple input reversing reduction gear assembly generally includes a turbine section, including a first turbine rotor and a second turbine rotor along a longitudinal direction, and a gear assembly proximate to the turbine section (i.e. within the turbine section or downstream of the turbine section). The first turbine rotor includes one or more radially extended members coupled to a radially extended rotor. The second turbine rotor includes an inner shroud defining a plurality of inner shroud airfoils extended outward of the inner shroud along the radial direction. The second turbine rotor is coupled to an input shaft connected to a first gear of the gear assembly. The first turbine rotor is coupled to one or more output accessories of the gear assembly.

In various embodiments, the counter rotating turbine engine with reversing reduction gear assembly defines a torque path from the second turbine rotor to the input shaft to the gear assembly, and from the gear assembly to the engine shaft via the second radial portion of the first turbine rotor. The engine may further define the torque path from the first turbine rotor to the engine shaft via the second radial portion of the first turbine rotor. Therefore, the torque path defines from the turbine section a substantially parallel torque path from the low pressure turbine to the fan assembly. In various embodiments, the second turbine rotor may distribute approximately 50% or more torque to the fan rotor through a first gear of the gear assembly, while the remainder is distributed from the first turbine rotor to the fan assembly through the engine shaft to which the fan assembly is coupled.

The counter rotating turbine with reversing reduction gear assembly may generally provide to the engine benefits of a reduction gear assembly, such as reduced fan rotor rotational speed, increased bypass ratio, reduced fan pressure ratio, decreased fan assembly noise, decreased fuel consumption, and/or increased engine efficiency, while further reducing or mitigating deleterious effects of reduction gear assemblies, such as increased gear assembly diameter and/or weight due to the magnitude of torque or power routed through the gear assembly.

Additionally, the counter rotating turbine engine with reversing reduction gear assembly may further increase engine efficiency and performance by providing a turbine and gear assembly arrangement that permits a three-spool engine configuration in substantially the same axial length of a comparable two-spool geared configuration. Therefore, the counter rotating turbine with reversing reduction gear assembly may further increase engine efficiency and performance by operating a low speed turbine rotor at a more desirable operating speed, by operating a fan assembly at a more desirable operating speed, and operating a booster or intermediate pressure compressor at a speed substantially independent of the low speed turbine rotor, such as non-proportionate of the low speed turbine rotor.

In various embodiments including an interdigitated turbine section, the counter rotating turbine engine may increase fuel efficiency, operational efficiency, and/or power output while reducing weight, part count, and/or packaging (e.g. radial and/or axial dimensions). For example, the interdigitated turbine section may enable a fan assembly to operate at an increased bypass ratio and/or enable the gas turbine engine to operate at an increased overall pressure ratio, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") relative to an engine incorporating a reduction gear assembly, while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). In the embodiment shown in FIG. 1, the compressor section 21 defines a high pressure compressor (HPC) 24 coupled to a high speed shaft 34, and an intermediate pressure compressor (IPC) 22 in serial arrangement with the HPC 24.

A fan assembly 14 is disposed forward or upstream 99 of the compressor section 21. The fan assembly 14 includes a fan rotor 15. The fan rotor 15 includes one or more fan stages 41, in which each fan stage 41 defines a plurality of blades 42 that are coupled to and extend outwardly from the fan rotor 15 in the radial direction R. In one embodiment as shown in FIG. 1, the fan rotor 15 defines a single fan stage or single circumferentially adjacent arrangement of the plurality of blades 42. In various other embodiments, the fan assembly 14 may further define a plurality of the stages 41. The fan rotor 15 are together rotatable about the axial centerline 12. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

During operation of the engine 10, as shown in FIGS. 1-4 collectively, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Figure 2:
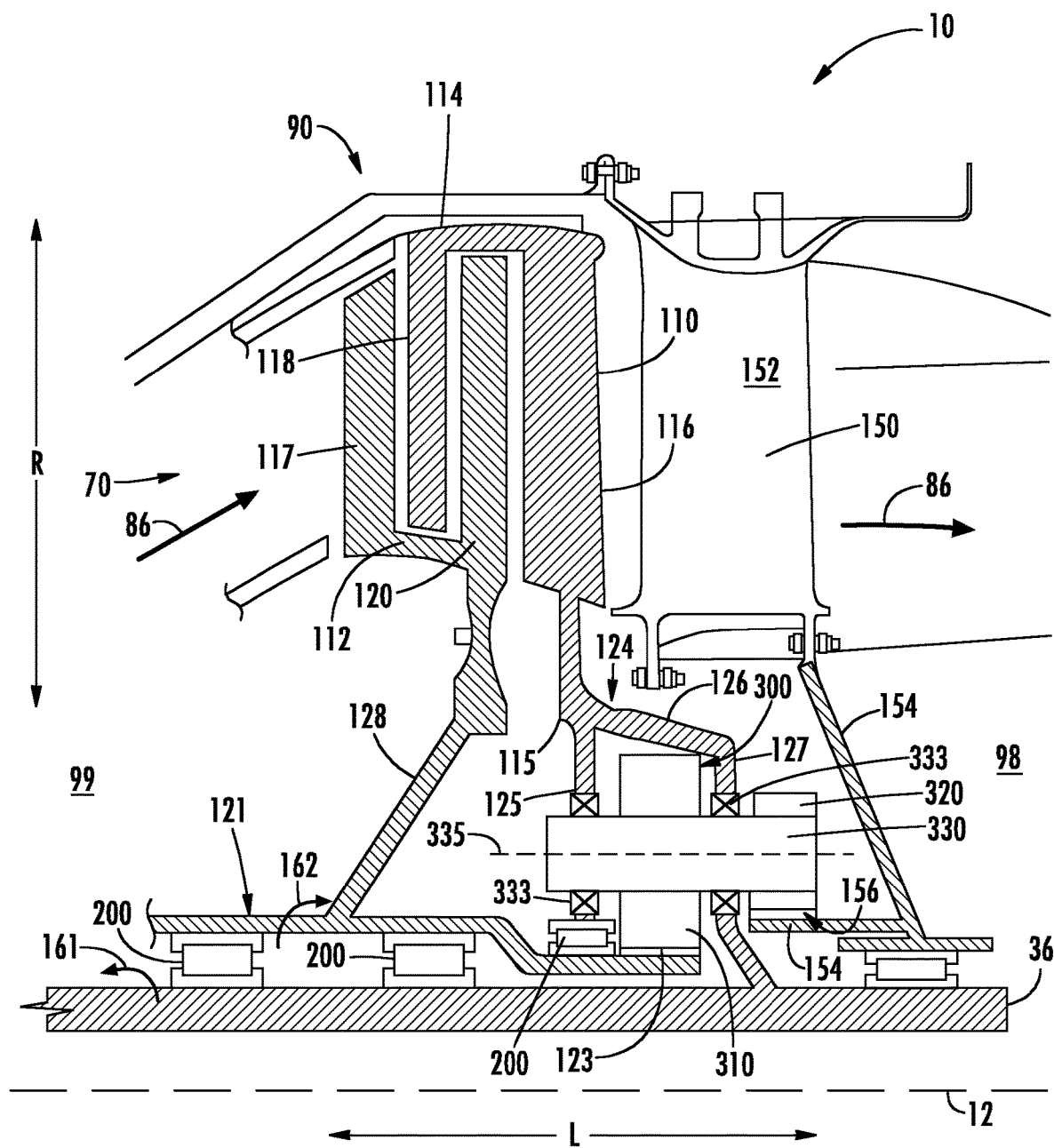
FIG. 2 is a schematic cross sectional view of an embodiment of the turbine section and reduction gear assembly shown in FIG. 1.

Referring now to FIG. 2, an exemplary embodiment of the turbine section 90 of the engine 10 is generally provided. The turbine section 90 includes a first turbine rotor 110 interdigitated with a second turbine rotor 120 along the longitudinal direction L. The first turbine rotor 110 includes one or more radially extended members 116 coupled to a radially extended rotor 115. The second turbine rotor 120 includes an inner shroud 112 defining a plurality of inner shroud airfoils 117 extended outward of the inner shroud 112 along the radial direction R. In various embodiments, the inner shroud 112 and/or the outer shroud 114 are formed or defined by a plurality of hubs, disks, or drums defining an axial or longitudinal flowpath, such as a portion of a core flowpath 70 of compressed air 82 and combustion gases 86 through the engine 10 from the upstream end 99 to the downstream end 98.

In various embodiments, the first turbine rotor 110 further includes an outer shroud 114 defining a plurality of outer shroud airfoils 118 extended inward of the outer shroud 114 along the radial direction R. The outer shroud 118 may be coupled to the one or more radially extended members 116 and extended forward or upstream 99. The plurality of outer shroud airfoils 118 may extend inward of the outer shroud 114 in interdigitation with the plurality of inner shroud airfoils 117 extended along the radial direction R from the inner shroud 112 of the second turbine rotor 120. In various embodiments, the second turbine rotor 120 is disposed upstream of the one or more radially extended members 116 of the first turbine rotor 110 and in interdigitation with the plurality of outer shroud airfoils 118 extended from the first turbine rotor 110.

In one embodiment, the first and second turbine rotors 110, 120 may together define at least three stages of rotating airfoils (e.g., radially extended member 116, second turbine rotor 120, and outer shroud airfoil 118 of first turbine rotor 110). In another embodiment, the first and second turbine rotors 110, 120 together define between three and ten stages or rows of rotating airfoils.

Referring still to FIG. 2, the engine 10 may further include a turbine frame 150 disposed aft or downstream 98 of the first and second turbine rotors 110, 120. The turbine frame 150 defines one or more exhaust vanes 152 extended in the radial direction R. The turbine frame 150 further includes a static support structure 154 extended inward along the radial direction R. The support structure 154 generally defines a static annular casing on which a gear assembly 300 is supported. The gear assembly 300 is coupled to the turbine frame 150 at the support structure 154. In various embodiments, the gear assembly 300 and the support structure 154 together transfer torque or power from the second turbine rotor 120 through the gear assembly 300 to an engine shaft 36 extended in the longitudinal direction L and through the gear assembly 300. The rotor 115 of the first turbine rotor 110 is further coupled to the gear assembly 300 and transfers torque or power to the engine shaft 36.

The gear assembly 300 is disposed generally within the turbine section 90, such as inward along the radial direction R, or downstream of the turbine section 90 along the longitudinal direction L. For example, the gear assembly 300 may be disposed toward the downstream end 98 of the turbine section 90. As another example, the gear assembly 300 is disposed downstream of the turbine section 90 within a turbine frame 150. The gear assembly 300 includes a first gear 310, a second gear 320, and an inner spool 330 extended through and coupled to the first gear 310 and the second gear 320. The inner spool 330 defines a gear axis 335 extended through the inner spool 330, the second gear 320, and the first gear 310. The gear axis 335 defines a centerline through each of the inner spool 330, the second gear 320, and the first gear 310. The gear axis 335 generally defines a centerline at which each of the inner spool 330, the second gear 320, and the first gear 310 are in generally concentric arrangement.

The turbine frame 150, such as specifically at the support structure 154, defines a stationary star gear 156 on which the second gear 320 is meshed. The star gear 156 is generally defined around and concentric to the axial centerline 12. The second gear 320 moves around the axial centerline 12 of the engine 10 by moving along the star gear 156 (e.g., walking or riding along the teeth of the star gear 156) defined on the support structure 154 of the turbine frame 150. The second gear 320 rotates around the axial centerline 12 on the generally annular support structure 154 of the turbine frame 150.

Referring still to FIG. 2, an input shaft 121 is connected to the first gear 310 and provides power into the gear assembly 300 via energy extraction from rotation of the second turbine rotor 120 coupled to the input shaft 121. The input shaft 121 may define an input shaft gear interface 123 at the coupling interface of the first gear 310 and the input shaft 121. The input shaft gear interface 123 may define a star gear interface upon which the first gear 310 moves along around the axial centerline 12.

During an operation of the engine 10, the combustion gases 86 provide energy to each of the first turbine rotor 110 and the second turbine rotor 120 to drive rotation around the axial centerline 12. The first turbine rotor 110, coupled to the second gear 320 of the gear assembly 300 and the engine shaft 36, generally rotates at a first speed around the axial centerline 12 in a first direction, such as shown schematically at arrow 161. The second turbine rotor 120, coupled to the input shaft 121 and the first gear 310 of the gear assembly 300, generally rotates at a second speed around the axial centerline 12 greater than the first speed and in a second direction, shown schematically at arrow 162, opposite of the first direction. As such, the first turbine rotor 110 and the second turbine rotor 120 define a counter-rotating relationship. For example, in the embodiment shown in FIG. 2, the gear assembly 300 is configured as a reversing reduction gear assembly.

The input shaft 121, rotating in the second direction, provides torque or power to the first gear 310 of the gear assembly 300. The input shaft gear interface 123, at which the first gear 310 is meshed with the input shaft 121, transfers energy to the first gear 310 and drives rotation of the first gear 310 about the gear axis 335 defined by the inner spool 330. Furthermore, the first gear 310, meshed with the input shaft 121 at the input shaft gear interface 123, moves along the input shaft gear interface 123 (e.g., walks or rides through the teeth of the interface 123) such as rotate the gear axis 335 of each combination of the first gear 310, the second gear 320, and the inner spool 330 around the axial centerline 12 of the engine 10.

The turbine frame 150, such as at the support structure 154 and via the star gear 156 defined thereon, generally provides a counteracting force enabling the second gear 320, coupled to the first gear 310 via the inner spool 330, to move along the support structure 154 around the axial centerline 12 of the engine 10.

The second turbine rotor 120 is coupled to the input shaft 121 and rotates about the axial centerline 12 at a second speed. In various embodiments, the second speed at which the second turbine rotor 120 rotates is greater than a first speed at which the first turbine rotor 110 rotates.

Furthermore, the second gear 320 generally rotates around the gear axis 335 defined through the inner spool 330 coupled through the second gear 320 and the first gear 310. For example, the gear assembly 300 may generally define a plurality of the second gear 320, the first gear 310, and the inner spool 330 coupled therethrough, a plurality of which are disposed in circumferential arrangement around the axial centerline 12.

The first turbine rotor 110 is coupled to an inner spool bearing 333, and the inner spool bearing 333 is coupled to the inner spool 330 of the gear assembly 300. The inner spool bearing 333 is generally disposed around each of the inner spools 330 of the gear assembly 300 (i.e., the gear assembly 300 may include a plurality of inner spools 330 coupling a first gear 310 and a second gear 320, in which each plurality is disposed in circumferential arrangement around the axial centerline 12). For example, the inner spool bearing 333 may be disposed generally concentric around the gear axis 335 defined by each inner spool 330. The inner spool bearing 333 may generally enable a pass-through of energy from the first turbine rotor 110 to the engine shaft 36, and from the second turbine rotor 120 through the first gear 310, the inner spool 330, and the second gear 320, and through the inner spool bearing 333 to the first turbine rotor 110 to the engine shaft 36.

In various embodiments, the first turbine rotor 110 defines a housing 124 generally surrounding the gear assembly 300 and coupled to the engine shaft 36. In one embodiment, the housing 124 includes an axial portion 126 and one or more radial walls 125, 127. A first radial wall 125 may extend at least partially in the radial direction R from a radially extended rotor 115 of the first turbine rotor 110 to the upstream end 99 of the gear assembly 300. The first radial wall 125 is coupled to the inner spool bearing 333 that is further coupled to the inner spool 330 of the gear assembly 300. In another embodiment, a second radial wall 127 extends at least partially in the radial direction R from the downstream end 98 of the gear assembly 300 to the engine shaft 36. The second radial wall 127 is coupled to another inner spool bearing 333 that is further coupled to the inner spool 330 of the gear assembly 300 toward the downstream end 98 of the gear assembly 300.

In one embodiment, the first radial wall 125 may further be coupled to a differential bearing 200 coupled to and disposed between the first radial wall 125 and the input shaft 121. The differential bearing 200 may provide support to the first turbine rotor 110 via the first radial wall 125 while enabling a difference in speed and rotation between the second turbine rotor 120 and the first turbine rotor 110. In various embodiments, differential bearings 200 are further disposed between the input shaft 121 and the engine shaft 36 to support the input shaft 121, the second turbine rotor 120, or both. In still another embodiment, the differential bearing 200 is disposed between the engine shaft 36 and the turbine frame 150 to support the engine shaft 36.

In one embodiment, such as shown in FIG. 2, the axial portion 126 of the housing 124 may connect the first radial wall 125 and the second radial wall 127 at least partially in the longitudinal direction L. In various embodiments, the first radial wall 125, the second radial wall 127, and/or the axial portion 126 may each define a substantially annular structure generally concentric about the axial centerline 12.

In various embodiments, the second turbine rotor 120 may define a radially extended rotor portion 128 extended from the input shaft 121 to the inner shroud 112. The rotor portion 128 of the second turbine rotor 120 is coupled to the input shaft 121. In various embodiments, the inner shroud 112 and the rotor portion 128 may define an integral structure. In one embodiment, the inner shroud airfoil 117 may further define an integral structure with the rotor portion 128 and inner shroud 112. In another embodiment, the rotor portion 128 defines a hub into which the plurality of inner shroud airfoils 117 installs.

The engine 10 shown and described in regard to FIG. 2 may define a torque path from the second turbine rotor 120 to the input shaft 121, from the input shaft 121 to the first gear 310, the inner spool 330, and the second gear 320 of the gear assembly 300, to the housing 124 of the first turbine rotor 110, and to the engine shaft 36. Still further, the engine 10 may define the torque path from the first turbine rotor 110 to the engine shaft 36 via the second radial wall 127 of the housing 124 of the first turbine rotor 110. In one embodiment further including the axial portion 126 of the first turbine rotor 110, the torque path may be defined from the first turbine rotor 110 through housing 124, such as through the axial portion 126 to the second radial wall 127, and to the engine shaft 36.

In various embodiments, the gear assembly 300 defines a compound gearbox. In one embodiment, the gear assembly 300 defines a reversing rotating compound gearbox. In still various embodiments of the engine 10, the gear assembly 300 defines a range of gear ratios of about −1.5:1 to about −3:1. For example, in one embodiment in which the gear assembly 300 defines a reversing rotating compound gear assembly, the input shaft 121 rotates approximately 1.5 times for each rotation of the first turbine rotor 110, including the housing 124 and the engine shaft 36, coupled to the second gear 320, and rotating in a direction opposite of the input shaft 121 coupled to the first gear 310. In other embodiments, the gear assembly 300 defines a range of gear ratios of about −1.8:1 to about −2.8:1.

In various embodiments, the turbine frame 150 further includes a cap covering or concealing the gear assembly 300 within the turbine frame 150 from external view and environmental conditions. The cap may be removed to provide relatively quick access to the gear assembly 300, the engine shaft 36, or other components of the engine 10 with rear mounted gear assembly 300, in proximity to an unobstructed aft, outside portion of the engine 10, in contrast to a forward mounted gear assembly configuration (e.g. within a fan assembly or LPC), in which the fan assembly is generally removed to access the gear assembly.

Referring back to FIG. 2, in various embodiments, the first and second turbine rotor 110, 120 together define a low pressure turbine (LPT) rotor. In such embodiments, the engine shaft 36 defines a low pressure (LP) shaft connected and rotatable with the fan rotor 15 of the fan assembly 14. The fan assembly 14 is driven collectively by the first turbine rotor 110 and the second turbine rotor 120. By arranging the engine 10 such that the first turbine rotor 110 is coupled directly to the engine shaft 36 that is coupled to the fan rotor 15, and by arranging the second turbine rotor 120 as coupled to the gear assembly 300 that is coupled at the second gear 320 to the engine shaft 36, in one embodiment the first turbine rotor 110 transmits approximately 25% to about 75% of power or torque for rotation of the fan assembly 14. In another embodiment, the second turbine rotor 120 transmits approximately 30% to about 60% of power or torque for rotation of the fan assembly 14, in which the second turbine rotor 120 transmits power or torque through the gear assembly 300 to the engine shaft 36 to the fan assembly 14. Additionally, interdigitating the first and second turbine rotors 110, 120 to define the LPT rotor results in efficiency and performance benefits due to relatively low turbine aerodynamic loading, reduced airfoil count (i.e. removed stationary vanes between rotating components), and/or reduced longitudinal dimensions of the LPT rotor.

Figure 3:
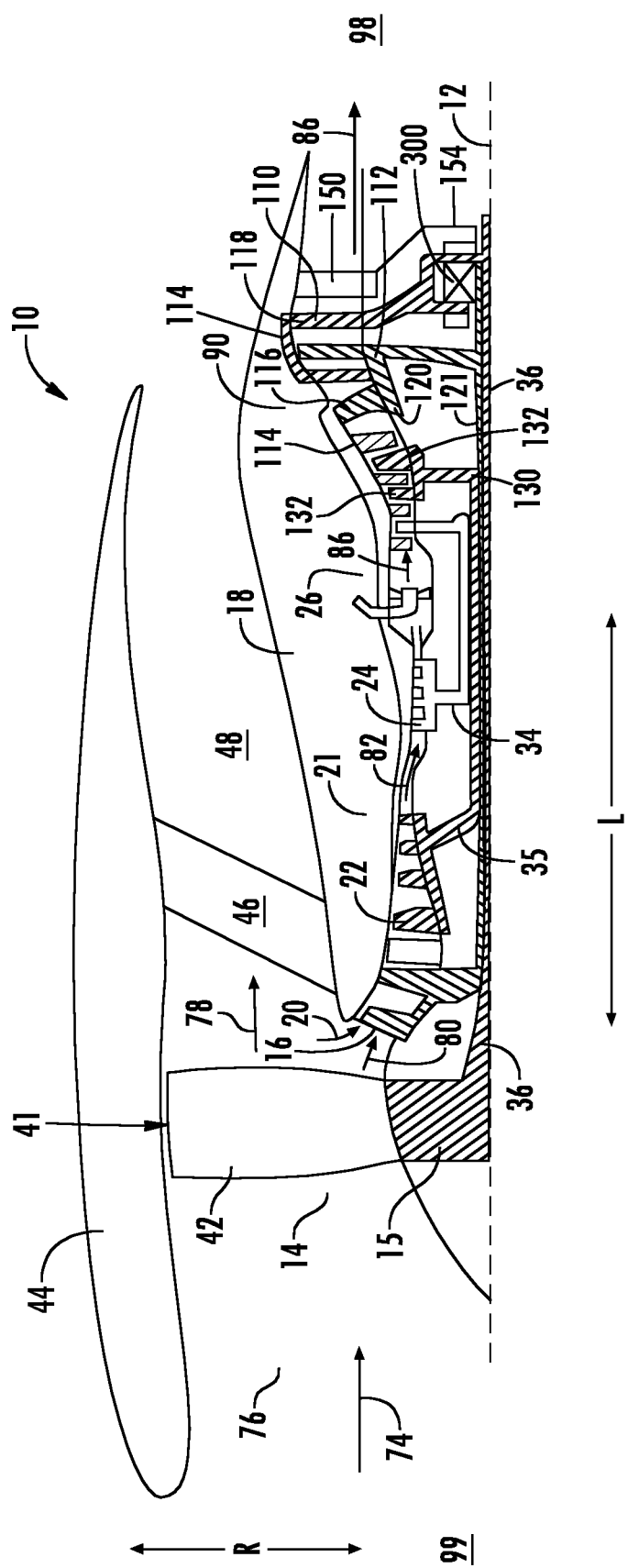
FIG. 3 is a schematic cross sectional view of another embodiment of the engine with reduction gear assembly shown in FIG. 2.

Referring now to FIG. 3, a schematic cross sectional view of another embodiment of the engine 10 is generally provided in which the compressor section 21 further includes a low pressure compressor (LPC) 16. The input shaft 121 may extend forward or toward the upstream end 99 to connect the LPC 16 to the input shaft 121 at the upstream end 99. At the downstream end 98, the input shaft 121 is connected to the first gear 310 of the gear assembly 300. As such, the second turbine rotor 120 may provide power or torque to the gear assembly 300 to drive the fan rotor 15 in addition to providing power or torque to drive the LPC 16. In various embodiments, the LPC 16 may rotate at a rate generally proportional to the fan rotor 15 depending on the gear ratios of the gear assembly 300.

Referring now to FIGS. 1 and 3, the turbine section 90 further includes a third rotating component 130 disposed forward or upstream 99 of the one or more radially extended members 116 of the first turbine rotor 110. The third rotating component 130 includes a plurality of third airfoils 132 extended outward along the radial direction R. In one embodiment, the third rotating component 130 is disposed forward or upstream 99 of the first and second turbine rotor 110, 120.

Figure 4:
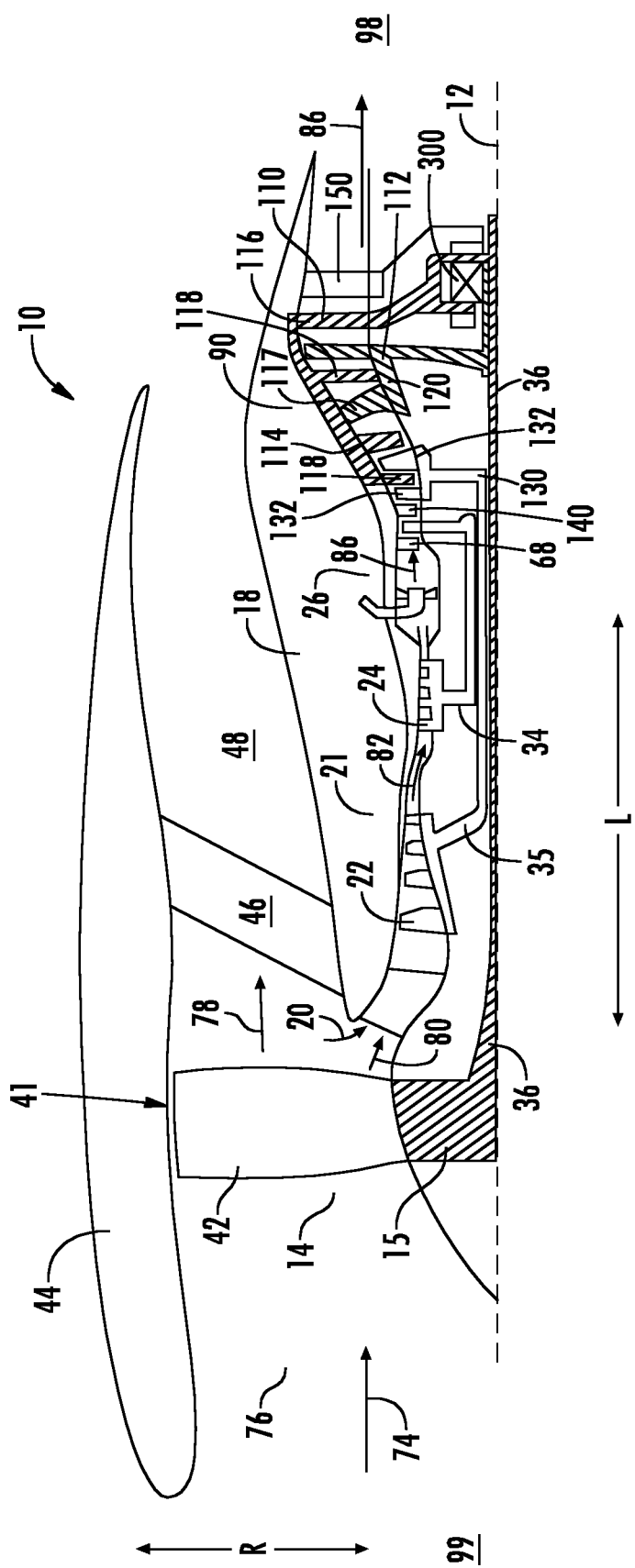
FIG. 4 is a schematic cross sectional view of yet another embodiment of the engine with reduction gear assembly shown in FIG. 2.

Referring now to the exemplary embodiments of the turbine section 90 shown in FIGS. 3 and 4, the outer shroud 114 of the first turbine rotor 110 further extends forward or upstream 99 of the radially extended member 116 along the longitudinal direction L. The outer shroud 114 further includes the plurality of outer shroud airfoils 118 extended inward along the radial direction R and interdigitated among the third rotating component 130, such as the plurality of third rotating airfoils 132 extended outward along the radial direction R from the third rotating component 130.

Referring to the embodiment shown in FIG. 4, the turbine section 90 may define the third rotating component 130 as one or more stages in which the outer shroud 114 of the first turbine rotor 110 extends forward or upstream 99 of the third rotating component 130, in which the plurality of outer shroud airfoils 118 interdigitates with the third rotating component 130. As such, in the exemplary embodiment shown in FIG. 4, the turbine section 90 defines, in serial flow arrangement along the longitudinal direction L from upstream 99 to downstream 98, a first stage defining the third rotating component 130, a second stage defining the first turbine rotor 110, a third stage defining the third rotating component 130, and a fourth stage defining the radially extended member 116 of the first turbine rotor 110.

In one embodiment, the third rotating component 130 may define the IPT rotor of the IPT assembly 30, in which the third rotating component 130, as the IPT rotor, is drivingly connected and rotatable with an intermediate pressure (IP) shaft 35. The IP shaft 35 is connected to the IPC 22, of which is driven in rotation by the third rotating component 130 of the turbine section 90.

In the embodiment shown in FIG. 4, the engine 10 and turbine section 90 may further include a fourth rotating component disposed forward or upstream 99 of the first, second, and third rotating components 110, 120, 130. In various embodiments, the fourth rotating component may define the HPT rotor.

Referring still to FIG. 4, the turbine section 90 may further include a turbine vane assembly 140 disposed forward or upstream 99 of the one or more radially extended members 116. The turbine vane assembly 140 may define a plurality of stationary airfoils (i.e. vanes) in circumferential arrangement. In one embodiment, the turbine vane assembly 140 is disposed forward or upstream 99 of the plurality of outer shroud airfoils 118 along the longitudinal direction L. For example, the turbine vane assembly 140 may define a first turbine vane or nozzle 68 toward the downstream end 98 of the combustion section 26. In other embodiments, the turbine vane assembly 140 is disposed between the fourth rotating component and other rotating components, such as the first, second, or third rotating components 110, 120, 130. In still other embodiments, the turbine vane assembly 140 may be defined between the third rotating component 130 along the longitudinal direction L. For example, in lieu of the first turbine rotor 110 extended forward or upstream from the radially extended member 116, the turbine vane assembly 140 may be disposed between the two third rotating component 130 stages.

Referring to FIGS. 1-4, in various embodiments the third rotating component 130 may rotate in a direction opposite of the first turbine rotor 110 (i.e. counter rotating). For example, the first turbine rotor 110 may be configured to rotate in the first direction 161, and the second and third rotating components 120, 130 may be configured to rotate in the second direction 162 opposite of the first direction 161. In various embodiments, the fourth rotating component may be configured to rotate in either the first direction 161 or in the second direction 162, either in co-rotation or in counter-rotation with the first turbine rotor 110.

The engine 10 and turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the first turbine rotor 110 interdigitated among the second and/or third rotating components 120, 130 may reduce packaging and reduce part count by removing stages of stationary airfoils between each rotating component. Additionally, the turbine section 90 may provide efficiency benefits comparable to a reduction gear assembly without adding weight or size (e.g. axial length) to the engine 10. Furthermore, the turbine section 90 may improve engine 10 efficiency by reducing requirements for cooling air, generally extracted from the compressor section 21 and often considered to remove potential propulsive energy from the engine 10.

Referring now to the embodiments shown and described in regard to FIGS. 1-4, each stage of the turbine section 90 may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. For example, in one embodiment, at least a portion of the plurality of outer shroud airfoils 118 defines a ceramic or CMC material. For example, the first stage 101 and/or the third stage 103 of the plurality of outer shroud airfoils 118 of the first turbine rotor 110 may define a ceramic or CMC material.

The turbine section 90, or portions or combinations of portions thereof, including the inner shroud 112, the outer shroud 114, the radially extended member(s) 116, the plurality of outer shroud airfoils 118, and/or the plurality of inner shroud airfoils 117, may be formed using additive manufacturing or 3D printing, or casting, forging, machining, or castings formed of 3D printed molds, or combinations thereof. The turbine section 90, or portions thereof, such as stages of the rotors 110, 120, 130 the outer shroud 114, the inner shroud 112, and other portions may be mechanically joined using fasteners, such as nuts, bolts, screws, pins, or rivets, or using joining methods, such as welding, bonding, friction or diffusion bonding, etc., or combinations of fasteners and/or joining methods.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems and methods provided herein may allow for increased high bypass ratios and/or overall pressure ratios over existing gas turbine engine configurations, such as turbofans, while maintaining or reducing packaging relative to other gas turbine engines of similar power output. The systems and methods described herein may improve bypass ratio and/or overall pressure ratio and thereby increase overall gas turbine engine efficiency. The systems provided herein may increase overall gas turbine engine efficiency by reducing or eliminating stationary airfoils that require cooling air (e.g. HPT or IPT vanes). Additionally, the systems provided herein may reduce gas turbine engine packaging and weight, thus increasing efficiency, by reducing rotating and/or stationary airfoil quantities (e.g. blades and/or vanes) by approximately 40% or more over gas turbine engines of similar power output.

The counter rotating turbine engine 10 with reversing reduction gear assembly 300 generally defines a torque path from the first turbine rotor 110 to the second gear 320 of the gear assembly 300 to the engine shaft 36 to the fan rotor 15 of the fan assembly 14, and from the second turbine rotor 120 to the input shaft 121 to the first gear 310 of the gear assembly 300, and from the second gear 320 of the gear assembly 300 to the engine shaft 36 to the fan rotor 15. Therefore, the torque path defines from the turbine rotor a substantially parallel torque path from the low pressure turbine (collectively, the first and second turbine rotors 110, 120) to the fan assembly 14. In various embodiments, the low speed turbine rotor may distribute approximately 50% torque from the low speed turbine rotor, via the second turbine rotor 120, to the fan assembly 14 through the gear assembly 300, while the remainder is distributed from the low speed turbine rotor, via the first turbine rotor 110, to the fan assembly 14 directly through the engine shaft 36 to which the fan assembly 14 is coupled.

The engine 10 described and shown herein, in which approximately 50% power or torque transmits through the gear assembly 300, may therefore define the gear assembly 300 as smaller in contrast to known integral drive turbofan configurations in which substantially 100% of the LPT rotor power and torque is transmitted in series from the LPT rotor to the fan assembly, including one or more stages of fan or LPC rotors. Still further, as the gear assembly 300 transmits less power or torque versus geared engine configurations of similar thrust output and/or size, bypass ratio, overall pressure ratio, or fan pressure ratio, the gear assembly 300 is subject to less wear and stress, and may therefore reduce failure risks associated with geared turbofan configurations. Still furthermore, as the gear assembly 300 transmits less power or torque, the reduction in gear assembly 300 dimensions enables benefits of a geared engine configuration without increases in engine diameter.

The counter rotating turbine with reversing reduction gear assembly may generally provide to the engine benefits of a reduction gear assembly, such as reduced fan rotor rotational speed, increased bypass pressure ratio, increased fan pressure ratio, decreased fan assembly noise, decreased fuel consumption, and/or increased engine efficiency, while further reducing or mitigating deleterious effects of reduction gear assemblies, such as increased gear assembly diameter and/or weight due to the magnitude of torque or power routed through the gear assembly.

Additionally, the counter rotating turbine engine with reversing reduction gear assembly may further increase engine efficiency and performance by providing a turbine and gear assembly arrangement that permits a three-spool engine configuration in substantially the same axial length of a comparable two-spool geared configuration. Therefore, the counter rotating turbine with reversing reduction gear assembly may further increase engine efficiency and performance by operating a low speed turbine rotor at a more desirable operating speed, by operating a fan assembly at a more desirable operating speed, and operating a booster or intermediate pressure compressor at a speed substantially independent of the low speed turbine rotor, such as non-proportionate of the low speed turbine rotor.

Still further, the systems shown in FIGS. 1-4 and described herein may reduce a product of a flow area and the square of the rotational speed (the product herein referred to as "$AN^2$") of the gas turbine engine relative to a gas turbine engine incorporating a forward mounted gear assembly (e.g. near or within the fan assembly). Generally, lowering the $AN^2$, such as by reducing the rotational speed and/or the flow area, increases the required average stage work factor (i.e. the average required loading on each stage of rotating airfoils). However, the systems and methods described herein may lower the $AN^2$ while also lowering the average stage work factor and maintaining axial length of the turbine section 90 (compared to engines of similar thrust output and packaging) by interdigitating the first turbine rotor 110 among the one or more stages of the second turbine rotor 120. Therefore, the first turbine rotor 110 may increase the quantity of rotating stages of airfoils while reducing the average stage work factor, and therefore the $AN^2$, while mitigating increases in axial length to produce a similar $AN^2$ value. The first turbine rotor 110 may further reduce the $AN^2$ while additionally reducing the overall quantity of airfoils, rotating and stationary, in the turbine section 90 relative to turbine sections of gas turbine engines of similar power output and/or packaging.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a longitudinal direction, a radial direction, and a circumferential direction, and an axial centerline extended along the longitudinal direction, and an upstream end and a downstream end along the longitudinal direction, the gas turbine engine comprising:
    an annular stationary turbine frame centered around the axial centerline;
    an engine shaft extended generally along the longitudinal direction;
    an input shaft extended generally along the longitudinal direction;
    a gear assembly comprising a first gear coupled to the input shaft, a second gear coupled to the turbine frame, and an inner spool coupling the first gear and the second gear, wherein the inner spool defines a gear axis extended therethrough, and wherein the inner spool, the first gear, and the second gear are together rotatable about the gear axis, and wherein the gear axis is rotatable about the axial centerline of the engine; and
    a housing coupled to the inner spool and the engine shaft.

2. The gas turbine engine of claim 1, wherein the inner spool of the gear assembly further comprises an inner spool bearing coupled to the inner spool and the housing, wherein the inner spool bearing permits rotation of the inner spool, the first gear, and the second gear about the gear axis, and wherein the inner spool, the first gear, and the second gear together move circumferentially around the axial centerline of the engine.

3. The gas turbine engine of claim 2, wherein the housing defines a radial wall coupled to the inner spool bearing of the inner spool, and wherein the housing defines an axial wall extended circumferentially around the gear assembly.

4. The gas turbine engine of claim 1, wherein the turbine frame defines a stationary star gear on which the second gear is moveable around the axial centerline of the engine.

5. The gas turbine engine of claim 1, wherein the input shaft defines an input shaft gear interface with the first gear of the gear assembly.

6. The gas turbine engine of claim 1, wherein the engine shaft and housing together rotate in a first circumferential direction and the input shaft rotates in a second circumferential direction opposite of the first circumferential direction.

7. The gas turbine engine of claim 1, wherein the engine shaft and housing together rotate at a first speed and the input shaft rotates at a second speed proportional to and greater than the first speed.

8. The gas turbine engine of claim 1, wherein the housing further comprises a second radial wall coupled to an inner spool bearing, and wherein the engine further comprises a differential bearing coupled to the second radial wall and the input shaft.

9. The gas turbine engine of claim 1, wherein the engine shaft extends generally along the longitudinal direction and radially within the input shaft and the gear assembly.

10. The gas turbine engine of claim 1, wherein the engine further comprises a bearing coupled to the turbine frame and the engine shaft.

11. The gas turbine engine of claim 1, further comprising:
a first turbine rotor coupled to the housing; and
a second turbine rotor coupled to the input shaft.

12. The gas turbine engine of claim 11, wherein the first turbine rotor comprises a rotating frame, and wherein the rotating frame comprises a plurality of radially extended members and an outer shroud extended along the longitudinal direction, and wherein a plurality of outer shroud airfoils extends inward along the radial direction from the outer shroud.

13. The gas turbine engine of claim 12, wherein the first turbine rotor and the second turbine rotor together define an interdigitated turbine rotor assembly, wherein the first turbine rotor and the second turbine rotor alternate along the longitudinal direction.

14. The gas turbine engine of claim 11, wherein the first turbine rotor provides between approximately 25% to about 75% of torque to the engine shaft.

15. The gas turbine engine of claim 11, wherein the second turbine rotor provides between approximately 30% to about 60% of torque to the engine shaft.

16. The gas turbine engine of claim 11, wherein the engine shaft is coupled to a fan assembly, and wherein the first turbine rotor and the second turbine rotor together define a low speed turbine rotor assembly.

17. The gas turbine engine of claim 1, wherein the gear assembly defines a reversing rotating compound gear assembly.

18. The gas turbine engine of claim 1, wherein the gear assembly defines a range of gear ratios of approximately −1.5:1 to about −3:1.

19. The gas turbine engine of claim 1, wherein the gear assembly defines a range of gear ratios of approximately −1.8:1 to about −2.8:1.

20. The gas turbine engine of claim 1, wherein the input shaft is coupled to the first gear radially within the gear assembly.

* * * * *